United States Patent [19]

Thielen

[11] Patent Number: 4,998,743
[45] Date of Patent: Mar. 12, 1991

[54] GOLF CART

[76] Inventor: Michael J. Thielen, 5708 N. Ansbrook Pl., Tucson, Ariz. 85741

[21] Appl. No.: 432,370

[22] Filed: Nov. 6, 1989

[51] Int. Cl.⁵ .............................................. B62B 1/02
[52] U.S. Cl. ............................ 280/47.26; 280/47.19; 280/DIG. 6
[58] Field of Search ........... 280/DIG. 6, 47.19, 47.18, 280/47.26, 47.27, 47.24, 47.28

[56] References Cited

U.S. PATENT DOCUMENTS

| | | | |
|---|---|---|---|
| 2,262,298 | 11/1941 | Procter | 280/DIG. 6 |
| 2,428,462 | 10/1947 | Procter | 280/47.19 |
| 2,757,012 | 7/1956 | Leffler | 280/DIG. 6 |
| 2,760,782 | 8/1956 | Hartzell | 280/DIG. 6 |
| 2,883,207 | 4/1959 | Reich | 280/47.19 |
| 2,918,297 | 12/1959 | Peters | 280/DIG. 6 |
| 2,985,462 | 5/1961 | Stamp | 280/DIG. 6 |
| 2,989,319 | 6/1961 | Northrop | 280/47.26 |
| 4,350,366 | 9/1982 | Helms | 280/47.26 |
| 4,550,930 | 11/1985 | Proffit | 280/DIG. 6 |
| 4,889,267 | 12/1989 | Bolton | 280/DIG. 6 |

Primary Examiner—David M. Mitchell
Attorney, Agent, or Firm—Leon Gilden

[57] ABSTRACT

A golf cart is set forth wherein a forward storage rack is presented for accommodation and storage of various golf clubs utilized in a series with a rear storage rack including resilient fingers aligned with underlying compartments to secure golf clubs most frequently used in a golf game. A forwardly mounted insulated and compartmentalized chest is secured to a forward bar of a rectangular underlying framework of the golf cart by use of a "C" shaped clip with a leg orthogonally formed to the clip. A threaded fastener is directed through the leg and into an underlying surface of the chest to secure the chest to the forward bar of the framework and enable selective removal thereof for portage, as desired.

1 Claim, 1 Drawing Sheet

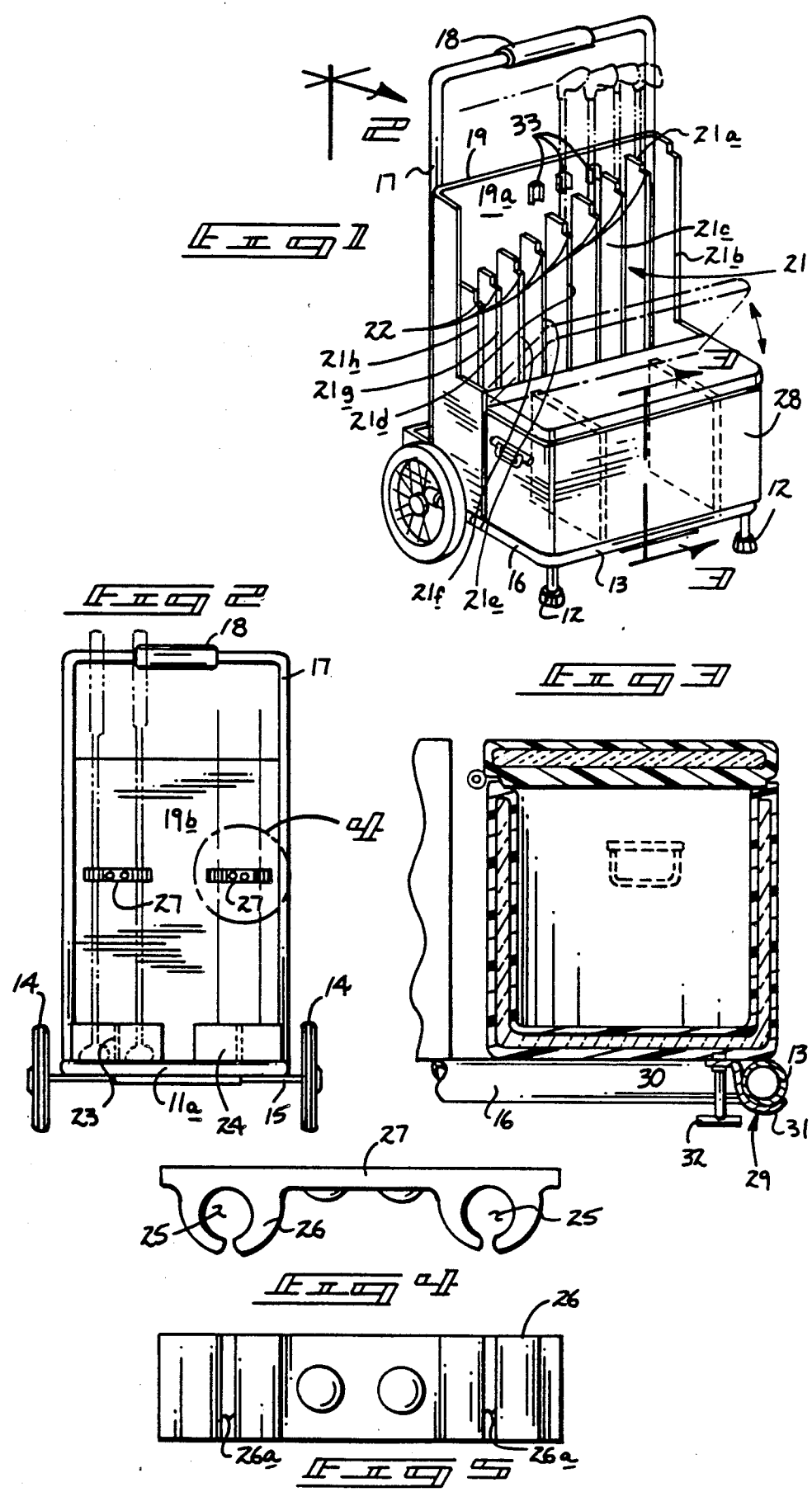

GOLF CART

BACKGROUND OF THE INVENTION

1. Field of the Invention

The field of invention relates to golf carts, and more particular pertains to a new and improved golf cart wherein the same provides for storage of the various clubs and equipment utilized in an associated golf game.

2. Description of the Prior Art

Golf carts have been utilized to accommodate various trends and conveniences associated with the game of golf. Heretofore, the organizations have presented various means for securing golf clubs and the like and some associated equipment, but has heretofore failed to provide an inner-related organization as set forth by the instant invention to enable convenient removal of a storage chest, as well as orientation of golf clubs and most frequently used golf clubs in a convenient manner, as set forth by the instant invention. For example, U.S. Pat. No. 2,760,782 sets forth a multi-wheeled golf cart utilizing an elongate storage compartment for securement of golf clubs with a central compartment formed within the storage compartment for securement of accessory items therewithin, but fails to provide the convenience of easily aligning and identifying various golf clubs and the like as utilized and oriented by the instant invention.

U.S. Pat. No. 2,957,700 to Beaurline sets forth a golf cart utilizing various support bracketry for securement of various clubs and for providing a spectator seat that may be utilized in the game.

U.S. Pat. No. 4,350,366 to Helms provides for a rearwardly mounted array of apertures for securement of golf clubs with a forwardly oriented hoop for securement of the golf bag therethrough.

U.S. Pat. No. 2,918,297 to Peters sets forth a variation of a golf cart for storage of various paraphernalia associated with the game, as well as with clubs that are arranged in a line orthogonally relative to the support axle of the cart, as opposed to the instant invention which arranges the most frequently utilized clubs rearwardly and in confronting relationship to an individual motivating the cart.

U.S. Pat. No. 4,550,930 to Proffit provides for a golf cart wherein laterally arranged support bracketry is positioned for providing a seat, a support bracket for chests, with a forwardly oriented bracket for securement of the golf bag, but as opposed to the instant invention, these various items are positioned exteriorly of wheels and a framework of the golf cart as the instant invention provides for a convenient compact storage unit.

As such, it may be appreciated that there is a continuing need for a new and improved golf cart which addresses both the problems of effectiveness as well as compactness in construction, and in this respect, the instant invention substantially fulfills this need.

SUMMARY OF THE INVENTION

In view of the foregoing disadvantages inherent in the known types of golf carts now present in the prior art, the present invention provides a golf cart wherein the same provides for the convenient array of a first series of golf clubs in a prearranged order and a second series of golf clubs most frequently utilized rearwardly of the first golf clubs to enable ready access thereto. As such, the general purpose of the present invention, which will be described subsequently in greater detail, is to provide a new and improved golf cart which has all the advantages of the prior art golf carts and none of the disadvantages.

To attain this, the present invention comprises a rectangular framework disposed generally horizontally with a single axle oriented rearwardly and orthogonally through opposed parallel side bars of the framework with wheels rotatably mounted thereto. A central support plate extends orthogonally upwardly from the framework and includes a rear surface with a series of compartments positioned at a lowermost portion of the support plate aligned with apertures overlying each of the compartments with each of the apertures defined by resilient "C" shaped fingers securing a shaft of a respective golf club therethrough. A forward surface of the plate includes a series of divider compartments of decreasing height with designation plates to designate an associated golf club positioned within each of the formed compartments. Sides of the central support plate include forwardly oriented "L" shaped plates overlying each of the side bars and directed forwardly of the central plate with an insulated compartment and storage chest of a width to extend from each of the "L" shaped plates to position overlying a forward bar of the framework. The chest includes a "C" shaped clamp with a leg orthogonally and integrally fixed thereto with a fastener directed through the leg and into a bottom surface of the chest to enable selective securement of the chest to the golf cart.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved golf cart which has all the advantages of the prior art golf carts and none of the disadvantages.

It is another object of the present invention to provide a new and improved golf cart which may be easily and efficiently manufactured and marketed.

It is a further object of the present invention to provide a new and improved golf cart which is of a durable and reliable construction.

An even further object of the present invention is to provide a new and improved golf cart which is susceptible of a low cost of manufacture with regard to both materials and labor, and which accordingly is then susceptible of low prices of sale to the consuming public, thereby making such golf carts economically available to the buying public.

Still yet another object of the present invention is to provide a new and improved golf cart which provides in the apparatuses and methods of the prior art some of the advantages thereof, while simultaneously overcoming some of the disadvantages normally associated therewith.

Still another object of the present invention is to provide a new and improved golf cart wherein the same provides for convenient organization of golf clubs mounted forwardly and rearwardly of a support plate with a storage chest oriented forwardly of the golf clubs and selective removal therefrom for portage, as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a rear orthographic view taken in elevation of the instant invention.

FIG. 3 is a cross-sectional view, taken along the lines 3—3 of FIG. 1, in the direction indicated by the arrows.

FIG. 4 is a top orthographic view of section 4, as illustrated in FIG. 2.

FIG. 5 is an orthographic view taken in elevation of the clamps, as illustrated in FIG. 4.

DESCRIPTION OF THE PREFERRED EMBODIMENT

With reference now to the drawings, and in particular to FIGS. 1 to 5 thereof, a new and improved golf cart embodying the principles and concepts of the present invention and generally designated by the reference numeral 10 will be described.

More specifically, it will be noted that the golf cart apparatus 10 essentially comprises a rectangular framework 11 with a plurality of support legs 12 mounted at remote ends of a forward bar 13 of the framework. A plurality of wheels 14 are rotatably mounted to an axle 15 integrally secured to side bars 16 of the framework at a position adjacent rear portions of the side bars. A "U" shaped handle 17 with a rigid top cross member is directed orthogonally upwardly from the framework at a position forwardly of a rear bar 11a of the framework and is formed with a resilient grip cylinder 18 formed medially about a central portion of the handle. A rigid support plate 19 is mounted and secured to a forward face of the "U" shaped handle and is of a height less than that of the handle and of a width equal to that of a spacing between the side bars 16. The support plate 19 is formed with a forward surface 19a and a rear surface 19b. A plurality of "L" shaped plates 20 are integrally formed to end portions of the rigid support plate and extend forwardly thereof. Positioned between the "L" shaped plates 20 to define a series of equal compartments therebetween are divided plates 21 comprising divider plates 21a through 21h inclusively of a decreasing height to enable the fixing of golf club designation plates 22 at an uppermost surface of each of the divider plates to enable designation of golf clubs positioned therewithin. Optionally, spring fingers 33 may be secured to the forward surface 19a and medially positioned in alignment with each of the underlying compartments to secure an associated golf club.

Integrally formed to a lowermost bottom surface of the rear surface 19b are pairs of compartments defined by first compartment pairs 23 and second compartment pairs 24 to secure therewithin golf clubs most frequently utilized by an individual. Each of the respective compartments defining the compartment pairs 23 and 24 respectively are aligned with a respective opening 25 overlying each of the compartments and formed by resilient "C" shaped fingers 26 defining a slot 26a mounted to a central support bar 27 fixedly mounted to the rear surface 19b.

Selectively mounted onto the framework 11 and of a length substantially equal to that of the support plate 19 and of a width such that the width of the compartments 23 or 24 plus the width of a respective adjacent "L" shaped plate 20, plus the width of the storage chest 28 equals the length of an associated side bar 16 whereupon the chest is positioned adjacent the "L" shaped plates 20 to enclose the compartments formed by the divider plates 21. The storage chest 28 is insulated and compartmentalized for storage of various golf paraphernalia therewithin, as well as storage of food items as desired. A clamp 29 includes a planar securement leg 30 fixed to an end of a "C" shaped clamp 31. The "C" shaped clamp 31 is of a length less than that of the forward bar 13, but is positioned medially thereof with a fastener 32 directed through the securement leg 30 and threadedly received within an underlying surface of the storage chest 28. If desired, the fastener 32 is merely withdrawn by contra-rotation of the "T" shaped handle associated with the fastener 32 to enable removal of the chest 28 from securement against the leg 30. The "T" shaped handle extends below the forward bar 13 to enhance access thereto by an individual.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A golf cart comprising, in combination,
   a framework including a forward bar spaced and parallel to a rear bar, and
   spaced parallel side bars, and
   a plurality of wheels rotatably mounted to an axle underlying and orthogonally directed relative to the side bars, and
   a central support plate of a width equal to a first distance fixedly mounted between the side bars including a rear plate surface and a forward plate surface, and
   a "U" shaped handle orthogonally mounted to the side bars and extending upwardly therefrom and overlying the central support plate, and
   a first series of compartments formed to and extending forwardly of the forward plate surface, and
   a second series of compartments formed to and extending rearwardly of the rear plate surface and extending to the rear bar, and
   a storage chest including a rear wall removably mounted adjacent the first series of compartments and extending to the forward bar, and
   the central support plate is fixedly secured to a forward surface of the "U" shaped handle, and
   wherein the first series of compartments are defined between the "L" shaped plates fixedly and orthogonally secured to and extending forwardly of the forward surface with a series of divider plates equally spaced between the "L" shaped plates wherein the divider plates are of gradually increasing height not to exceed a height defined by the central support plate, and each divider plate includes a designation plate formed to an upper forward surface of each divider plate providing information regarding a respective golf club positioned forwardly of each divider plate, and each "L" shaped plate includes a lowermost surface mounted coextensively to the rear wall of the storage chest, and
   wherein the second series of compartments is defined by a plural series of compartment pairs, and each compartment of the compartment pairs is aligned with an overlying aperture, each aperture defined by a plurality of resilient fingers defining an elongate slot therebetween to enable removal and positioning of a golf club handle within the aperture, and
   wherein the storage chest is insulated and compartmentalized, and
   wherein the storage chest further includes a handle formed on each end surface of the chest, and
   wherein a width defined by the chest, and a further width defined by the lowermost surface of each "L" shaped plate, and yet further width defined by each compartment of each compartment pair defines a second length equal to a side bar, and
   further including a "C" shaped clamp releasably mounted over an underlying surface of the forward bar with a planar leg integrally mounted to an end of the "C" shaped clamp, and a threaded fastener directed through the leg and into a bottom surface of the chest to secure the chest to the framework, and
   wherein the threaded fastener includes a "T" shaped handle on an end remote from the chest and wherein the "T" shaped handle is positioned below the forward bar when threaded fastener is secured through the leg and into the chest.

* * * * *